US012118823B2

(12) United States Patent
Pan et al.

(10) Patent No.: US 12,118,823 B2
(45) Date of Patent: Oct. 15, 2024

(54) INFORMATION PROCESSING METHOD AND APPARATUS, ELECTRONIC DEVICE, AND STORAGE MEDIUM

(71) Applicant: SHENZHEN FUTU NETWORK TECHNOLOGY CO., LTD, Guangdong (CN)

(72) Inventors: Minyi Pan, Guangdong (CN); Zhen Xie, Guangdong (CN)

(73) Assignee: SHENZHEN FUTU NETWORK TECHNOLOGY CO., LTD, Guangdong (CN)

( * ) Notice: Subject to any disclaimer, the term of this patent is extended or adjusted under 35 U.S.C. 154(b) by 370 days.

(21) Appl. No.: 17/564,261

(22) Filed: Dec. 29, 2021

(65) Prior Publication Data
US 2022/0157081 A1    May 19, 2022

Related U.S. Application Data

(63) Continuation of application No. PCT/CN2021/106887, filed on Jul. 16, 2021.

(30) Foreign Application Priority Data

Jul. 24, 2020 (CN) .......................... 202010728731.3

(51) Int. Cl.
  *G06V 40/16* (2022.01)
  *G06N 3/08* (2023.01)
  *G06Q 10/105* (2023.01)
(52) U.S. Cl.
  CPC ............. *G06V 40/172* (2022.01); *G06N 3/08* (2013.01); *G06Q 10/105* (2013.01); *G06V 40/171* (2022.01)

(58) Field of Classification Search
  CPC .. G06V 40/172; G06V 40/171; G06V 10/267; G06V 10/82; G06N 3/08;
  (Continued)

(56) References Cited

U.S. PATENT DOCUMENTS

2013/0204645 A1   8/2013   Lehman et al.
2020/0226421 A1   7/2020   Almazan et al.

FOREIGN PATENT DOCUMENTS

CN    101504756 A    8/2009
CN    106325988 A    1/2017
(Continued)

OTHER PUBLICATIONS

The First Office Action in counterpart China Application No. 202010728731.3, dated Jun. 3, 2023.
(Continued)

*Primary Examiner* — Said M Elnoubi

(57) ABSTRACT

Provided are an information processing method and apparatus, an electronic device, and a storage medium. The method includes: acquiring an information processing application transmitted by a first client, and executing a predetermined command in accordance with a timer-based task mechanism to transmit a first prompt message for reviewing the information processing application to a second client; identifying, in response to an operation instruction on the second client, the information processing application as a target information processing application; acquiring an information processing request for the target information processing application transmitted by the first client in accordance with an asynchronous mechanism, and processing the information processing request; and feeding, in response to a polling initiated by the first client, a processing
(Continued)

result of the information processing request back to the first client when the processing the information processing request is completed.

8 Claims, 9 Drawing Sheets

(58) Field of Classification Search
CPC ...... G06N 3/045; G06N 20/00; G06Q 10/105; G06Q 20/401; G06Q 40/04; Y02D 10/00
See application file for complete search history.

(56) References Cited

FOREIGN PATENT DOCUMENTS

| | | | |
|---|---|---|---|
| CN | 109859112 A | | 6/2019 |
| CN | 110348331 A | | 10/2019 |
| CN | 111209823 A | | 5/2020 |
| CN | 111274850 A | * | 6/2020 |
| CN | 111932266 A | | 11/2020 |
| JP | 2002108746 A | | 4/2002 |
| JP | 2003085368 A | * | 3/2003 |
| JP | 2003510708 A | | 3/2003 |
| JP | 2004021332 A | | 1/2004 |
| WO | 2016026064 A1 | | 2/2016 |
| WO | 2020087922 A1 | | 5/2020 |

OTHER PUBLICATIONS

The Second Office Action in counterpart China Application No. 202010728731.3, dated Jul. 28, 2023.
Notice of Reasons for Refusal in Japanese Patent Application No. 2022-562407, dated Nov. 7, 2023.
Notification to Grant Patent Right for Invention in counterpart China Application No. 202010728731.3, dated Oct. 9, 2023.

* cited by examiner

Information Processing

✓ ─── ○ ─── ○
Fill in amount · Confirm information · Complete submission

Information processing mode: online-offline integrated    [Reselect]

Amount of resources to be transferred
                                        180350.00

Prompt: please transfer the resources to first target address

[Submit application]

FIG. 3

Application Review

▽ Select   ≫ Export Data

| Application Date | Employee Name | ... | Status | Operation | Record |
|---|---|---|---|---|---|
| 2020-05-06 | Zhang X | ... | Completed | [Approve] [Reject] | View |
| 2020-05-07 | Li X | ... | Completed | [Approve] [Reject] | View |
| 2020-05-07 | Liu X | ... | Approved | [Approve] [Reject] | View |
| 2020-05-08 | Liu XX | ... | Rejected | [Approve] [Reject] | View |
| 2020-05-10 | Wang X | ... | Approved | [Approve] [Reject] | View |
| ... | | | ... | ... | ... |

FIG. 4

INFORMATION PROCESSING METHOD AND APPARATUS, ELECTRONIC DEVICE, AND STORAGE MEDIUM

CROSS REFERENCE TO RELATED APPLICATION

The present disclosure is a continuation of International Application No. PCT/CN2021/106887, filed on Jul. 16, 2021, which claims priority to Chinese Patent Application No. 202010728731.3, titled "INFORMATION PROCESSING METHOD AND APPARATUS, ELECTRONIC DEVICE, AND STORAGE MEDIUM", filed on Jul. 24, 2020 in the name of SHENZHEN FUTU NETWORK TECHNOLOGY CO., LTD. The disclosures of the aforementioned applications are hereby incorporated by reference in their entireties.

TECHNICAL FIELD

The present disclosure relates to computer technology, and more particularly, to an information processing method and apparatus, an electronic device, and a storage medium.

BACKGROUND

An option is a contract between two parties on the right to buy and sell in the future. Exercise means that an obligee in an option contract asks an obligor to carry out obligations agreed in the option in accordance with agreed time, price, and method, and the obligor of the option must provide the corresponding obligations when the obligee exercises the option. For example, in an equity incentive mechanism between a company and an employee, the obligee (employee) of the option can pay the agreed cost price to obtain a corresponding number of shares after the option matures. In the existing equity incentive mechanism between companies and employees, the employees typically exercise the option in a completely online process. However, due to the lack of data resources required for the exercise, the efficiency of information processing in the entire exercise process is relatively low, which in turn leads to low efficiency in option exercise.

SUMMARY

In view of the above problem, the present disclosure provides an information processing method and apparatus, an electronic device, and a storage medium, capable of improving the efficiency of information processing in the process of option exercise, thereby improving the efficiency of option exercise.

To achieve the above object, a first aspect of the embodiments of the present disclosure provides an information processing method. The method includes: acquiring an information processing application transmitted by a first client, and executing a predetermined command in accordance with a timer-based task mechanism to transmit a first prompt message for reviewing the information processing application to a second client; identifying, in response to an operation instruction on the second client, the information processing application as a target information processing application, the operation instruction being triggered when a user of the second client determines that an amount of resources to be transferred offline from a user of the first client are received at a first target address; acquiring an information processing request for the target information processing application, and processing the information processing request, the information processing request being transmitted by the first client in accordance with an asynchronous mechanism; and feeding, in response to a polling initiated by the first client, a processing result of the information processing request back to the first client when the operation of processing the information processing request is completed.

A second aspect of the embodiments of the present disclosure provides an information processing apparatus. The apparatus includes: a first acquiring module configured to acquire an information processing application transmitted by a first client, and execute a predetermined command in accordance with a timer-based task mechanism to transmit a first prompt message for reviewing the information processing application to a second client; a first responding module configured to identify, in response to an operation instruction on the second client, the information processing application as a target information processing application, the operation instruction being triggered when a user of the second client determines that an amount of resources to be transferred offline from a user of the first client are received at a first target address; a second acquiring module configured to acquire an information processing request for the target information processing application, and process the information processing request, the information processing request being transmitted by the first client in accordance with an asynchronous mechanism; and a second responding module configured to feed, in response to a polling initiated by the first client, a processing result of the information processing request back to the first client when the operation of processing the information processing request is completed.

A third aspect of the embodiments of the present disclosure provides an electronic device. The electronic device includes an input device and an output device, and also includes: a processor adapted to implement one or more instructions; and a computer storage medium storing one or more instructions which are adapted to be loaded by a processor to perform the method as described in the first aspect.

A fourth aspect of the embodiments of the present disclosure provides a computer storage medium. The computer storage medium stores one or more instructions which are adapted to be loaded by a processor to perform the method.

The above solutions of the present disclosure include at least the following advantageous effects. Compared with the related art, in the embodiment of the present disclosure, an information processing application transmitted by a first client is acquired, and a predetermined command is executed in accordance with a timer-based task mechanism to transmit a first prompt message for reviewing the information processing application to a second client. In response to an operation instruction on the second client, the information processing application is identified as a target information processing application. An information processing request for the target information processing application transmitted by the first client is acquired using an asynchronous mechanism, and the information processing request is processed. In response to a polling initiated by the first client, a processing result of the information processing request is fed back to the first client when the operation of processing the information processing request is completed. In this way, the timer-based task mechanism executes the predetermined command to issue the review prompt, such that the reviewer can be notified in time, thereby shortening the information processing period. In addition, the asynchronous mechanism is used to initiate the information processing request, so as to prevent the first client from "waiting in vain". The dependence between task processes can be reduced, and the entire information processing can adopt an online-offline integrated form, without having to consider the problem of data resources. This is advantageous in improving the efficiency of information processing in the option exercise process, thereby improving the efficiency of option exercise.

BRIEF DESCRIPTION OF DRAWINGS

In order to describe the technical solutions in the embodiments of the present disclosure or the prior art more clearly, the drawings that need to be used in the description of the embodiments or the prior art will be introduced briefly below. Obviously, the drawings described below are only some embodiments of the present disclosure. For those of ordinary skill in the art, other drawings can be obtained based on these drawings without inventive efforts.

FIG. 3 is an example diagram showing an information processing application submission interface according to an embodiment of the application;

FIG. 4 is an example diagram showing an information processing application review interface according to an embodiment of the application;

DESCRIPTION OF EMBODIMENTS

In order to enable those skilled in the art to better understand the solutions of the present disclosure, the technical solutions in the embodiments of the present disclosure will be described clearly and completely below in conjunction with the drawings in the embodiments of the present disclosure. Obviously, the described embodiments are only some, not all, of the embodiments of the present disclosure. Based on the embodiments in the present disclosure, all other embodiments that can be obtained by those of ordinary skill in the art without inventive efforts are to be encompassed by the scope of the present disclosure.

The terms "including" and "having" as used in the specification, claims and drawings of the present disclosure, and any variants thereof, are intended to cover non-exclusive inclusions. For example, a process, method, system, product, or device that includes a series of steps or units is not limited to the described steps or units, but may optionally further include steps or units that are not described, or may optionally further include other steps or units that are inherent to the process, method, product, or device. In addition, the terms "first", "second", and "third" are used to distinguish different objects from each other, rather than describe a specific sequence.

Figure 1:
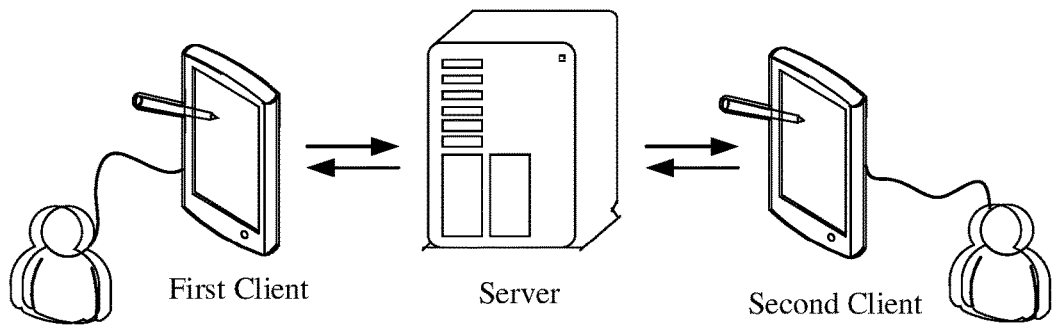
FIG. 1 is a schematic diagram showing a network system architecture according to an embodiment of the present disclosure.

Referring to FIG. 1, FIG. 1 is a schematic diagram showing a network system architecture according to an embodiment of the present disclosure. The information processing method provided in the present disclosure can be implemented based on the network system. As shown in FIG. 1, the network system architecture includes a first client, a server, and a second client. The first client and the second client may each include a control module, an input/output module, and a display module. The control module may be a processor, a microprocessor, a graphics processing unit, etc., and may be configured to process the messages transmitted by the server, control the input or output of the input/output module and the display of the display module. The server may include a control module, an input/output module, an interface invoking module, and a plurality of connected databases. The control module can control operations of other parts in a similar way. The interface invoking module may be configured to invoke various interfaces to perform related operations, such as invoking a data query interface to retrieve information stored in a database.

Specifically, the input/output module of the server and the input/output modules of the two clients can interact with each other using a communication protocol. After the first client submits an information processing application to the server, the server can invoke a command execution interface to execute a predetermined command to transmit a review prompt to the second client. The second client may transmit an administrator's operation instruction to the server via the input/output module. For example, the administrator may trigger a control on the second client, and the server may invoke an application identification interface through the interface invoking module according to the operation instruction, to identify the information processing application as approved or rejected. The user can check the status of the information processing application through the display module of the first client. If it is approved, the user can submit an information processing request to the server via the input/output module of the first client. The server can invoke an information processing interface through the interface invoking module to perform processing operations, such as calculating a growth of resource for a current information processing, calculating an amount of resources actually deserved, etc., and return a processing result to the first client after the processing is completed. For example, the processing result may include an application date, an amount of processed information, a processing cost, a status identification, etc. The first client can display the processing result to the user through the display module. With the information interaction between the server and the first client or the second client, the efficiency of information processing in the process of option exercise by the user can be improved, thereby improving the efficiency of option exercise.

Based on the network system architecture shown in FIG. 1, an information processing method according to the embodiment of the present disclosure will be described in detail below in conjunction with other drawings.

Figure 2:
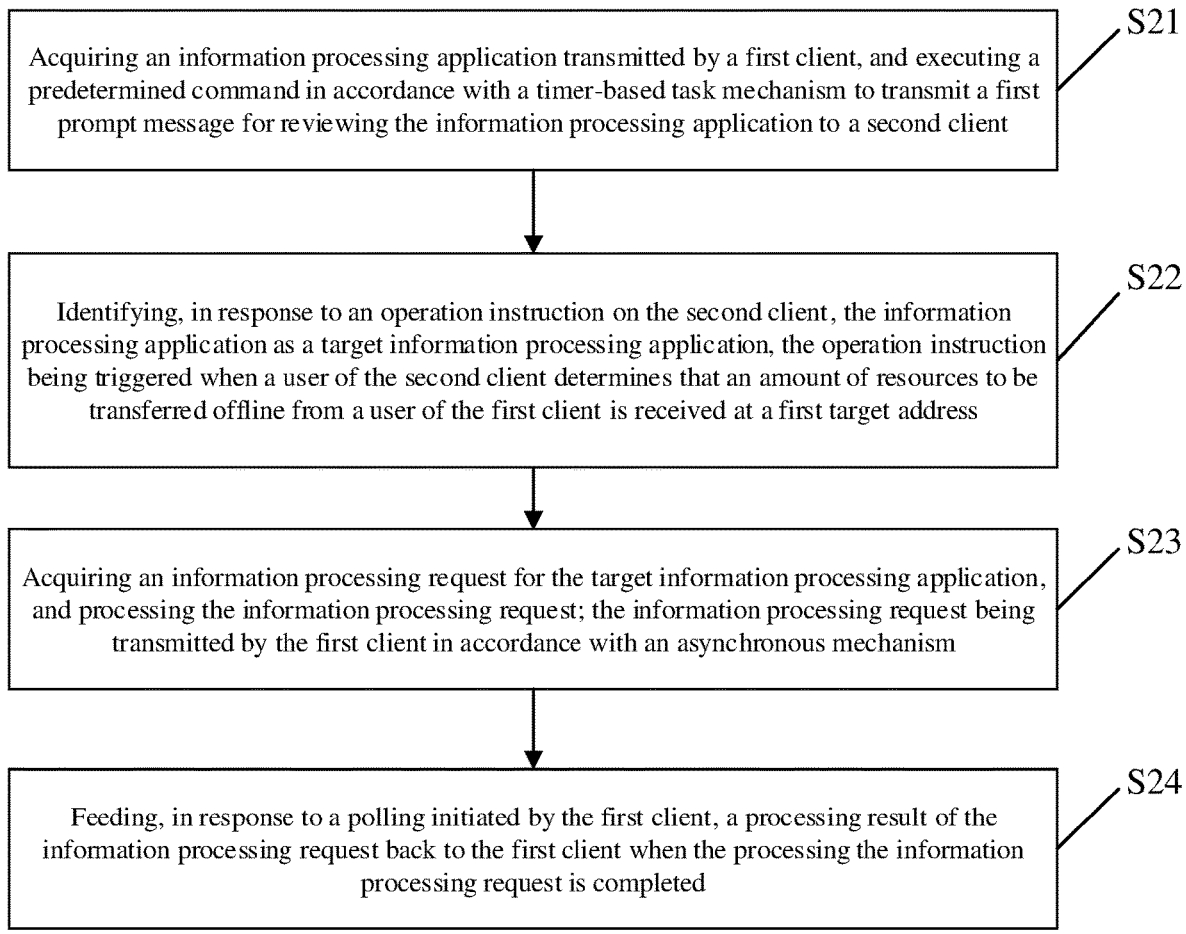
FIG. 2 is a schematic flowchart illustrating an information processing method according to an embodiment of the present disclosure.

Referring to FIG. 2, which is a schematic flowchart illustrating an information processing method according to an embodiment of the present disclosure, the information processing method can be applied in a server, and as shown in FIG. 2, include steps S21 to S24.

At S21, an information processing application transmitted by a first client is acquired, and a predetermined command is executed in accordance with a timer-based task mechanism to transmit a first prompt message for reviewing the information processing application to a second client.

In a specific embodiment of the present disclosure, the first client refers to a client on an employee side, and the second client refers to a client on an administrator side. A user may enter an information processing application interface of the first client, which is by default in an online mode in the entire process. The user can choose to enter the online-offline integrated mode in which applications are still submitted in an online mode, while resources are transferred in or out in an offline mode. For example, the user can input the amount of information to be processed currently into the information processing application interface, and then select the online-offline integrated mode for information processing. The first client switches from the information processing application interface to an information processing application submission interface, as shown in FIG. 3. The information processing application submission interface includes an amount of resources to be transferred that the user of the first client needs to transfer to the first target address for the current information processing, the first target address, and an information processing mode. The amount of resources to be transferred can be calculated by the server based on the amount of information to be processed as entered by the user according to: $Y=(C+X)*E$, where Y represents the amount of resources to be transferred, C represents a processing cost for the current information processing, X represents a predetermined amount of additional resources, and E represents the third predetermined parameter, and $C=Q*P2$, where Q represents the amount of information to be processed, and P2 represents a predetermined unit amount of resources. The first target address can be a company's account address, and the user can confirm completion on an information processing application submission interface, and an information processing application can be transmitted to the server through the first client. Of course, for non-reviewed information processing applications, the user can still modify or cancel them on an application record interface of the first client, for example, modify the amount of information to be processed.

After the server acquires the information processing application submitted by the first client, it executes the predetermined command in accordance with the timer-based task mechanism crontab to transmit the first prompt message to the second client. The first prompt message is used to prompt the user of the second client to review the information processing application timely. Here, crontab is a program that can periodically execute certain commands in an operating system. The format of the predetermined command can be time+command, e.g., minute hour day month week command, where minute hour day month week represents the time to execute the command, and command represents the command, which can be a system command or a customized script file. When the time is matched by each period, the server can execute the predetermined command to transmit the first prompt message to the second client. For example, the predetermined command may be to query all information processing applications to be reviewed from a database, and the first prompt message may carry all the information processing applications to be reviewed that are found.

Optionally, after acquiring the information processing application transmitted by the first client, the method may further include: performing a legality check on the information processing application; and when the information processing application passes the legality check, adding the information processing application to a list of information processing applications to be reviewed in the database.

In a specific embodiment of the present disclosure, after the user of the first client submits the information processing application, the server may perform a legality check on the information processing application, mainly by checking whether the user account exists, whether the account can submit an information processing application, etc. If the legality check is passed, the information processing application is added to the list of information processing applications to be reviewed according to the time at which it is submitted by the first client. The list of information processing applications to be reviewed can be displayed on an information processing application review interface of the second client.

At S22, in response to an operation instruction on the second client, the information processing application is identified as a target information processing application. The operation instruction is triggered when a user of the second client determines that an amount of resources to be transferred offline from a user of the first client is received at a first target address.

In a specific embodiment of the present disclosure, after the second client receives the first prompt message transmitted by the server, the user (administrator) of the second client can enter an information processing application review interface to perform a review operation. As shown in FIG. 4, the interface displays a plurality of information processing applications recorded in the list of information processing applications to be reviewed in the database. The list of information processing applications to be reviewed may include various fields such as an application date, an employee name, an employee number, an amount of information to be processed or an amount of processed information, an amount of resources to be transferred, an amount of resources actually deserved, a status, an operation, a record, etc. The status can include: to be reviewed, approved, rejected, and completed. The operation can include approved and rejected. The administrator may also review an operation record of corresponding information processing application in the "record" field. Further, the administrator can also select the information processing application he/she wants to review based on a combination of one or more conditions such as the employee's name, status, and application date.

In addition, since the user of the first client chooses the online-offline integrated mode, the administrator needs to confirm via the second client whether the amount of resources to be transferred offline from the user of the first client is received at the first target address. For example, for 180350 in FIG. 3, in the case of reception confirmed, the administrator initiates a review of the information processing application at the second client. The server identifies the information processing application submitted by the first client as the target information processing application according to the operation instruction of the administrator on the information processing application review interface. The target information processing application is an application whose status is identified as approved. Optionally, the operation instruction may include an approval instruction and a rejection instruction. When the server receives the approval instruction, the information processing application is identified as the target information processing application. Further, when the administrator's approval instruction on the information processing application review interface is obtained, a reconfirmation interface indicating the approval can be returned to the second client. When an approval confirmed signal triggered by the administrator on the reconfirmation interface is obtained, the information processing application is identified as the target information processing application. Similarly, for the rejection operation, the scheme of two confirmations may also be adopted. Optionally, when the administrator enters the information processing application review interface, the interface may display the list of information processing applications to be reviewed, and the administrator may identify the information processing application as the target information processing application in the list of information processing applications to be reviewed.

At S23, an information processing request for the target information processing application is acquired, and the information processing request is processed. The information processing request is transmitted by the first client in accordance with an asynchronous mechanism.

In a specific embodiment of the present disclosure, after the server identifies the information processing application as the target information processing application, the first client can synchronously learn that the information processing application has been approved. For example, the server may return to the client a prompt message indicating that the information processing application has been approved, e.g., "The information processing application for 1000 shares of Tencent Holdings you submitted on 2020 Jul. 13 has been approved, click to process". At this time, the user can initiate the information processing request in accordance with the asynchronous mechanism at the first client. Of course, if the review is rejected, a corresponding prompt message can also be returned to the first client. Optionally, when the user of the first client submits the information processing request through the information processing request interface, a confirmation interface for confirming the submission of the information processing request may be fed back to the first client. When a signal confirming the submission as triggered by the user of the first client on the confirmation interface is obtained, it is confirmed that the information processing request is submitted successfully and the processing is started. The so-called asynchronous mechanism means that the first client can directly return after submitting the information processing request to the server, without having to wait for the server to feed back the processing result, and the server will inherently return the processing result to the first client after the processing is completed. Compared with the synchronous mechanism for submitting the request, the asynchronous mechanism can reduce the dependency between tasks, so as to prevent the first client from being in a "waiting in vain" state all the time and improve the user experience.

Optionally, the operation of processing the information processing request include may:

calculating a processing cost of a current information processing based on a predetermined unit amount of resources of information processed the current information processing and the amount of information to be processed;

calculating a growth of resource for the current information processing based on a current unit amount of resources of the information processed the current information processing, the predetermined unit amount of resources and the amount of information to be processed according to:

$S=(P1-P2)*Q$, where S represents the growth of resource, P1 represents the current unit amount of resources, P2 represents the predetermined unit amount of resources, and Q represents the amount of information to be processed;

calculating an amount of additional resources for the current information processing based on the growth of resource according to:

$P=(S/M*R-T)*M$, where P represents the amount of additional resources, M represents predetermined time, R represents a first predetermined parameter, and T represents a second predetermined parameter;

calculating an amount of resources actually deserved for the current information processing based on the processing cost and the amount of additional resources according to:

$N=(C+P)*E$, where N represents the amount of resources actually deserved, C represents the processing cost, and E represents a third predetermined parameter;

calculating an amount of resources to be returned or supplemented for the current information processing based on the amount of resources to be transferred and the amount of resources actually deserved;

transferring the amount of resources to be returned to a second target address when the amount of resources to be returned is calculated, or transmit to the first client a third prompt message including the amount of resources to be supplemented when the amount of resources to be supplemented is calculated, the third prompt message being used to prompt the user of the first client to transfer the amount of resources to be supplemented to the first target address; and identifying the information processing application as a completed information processing application.

In a specific embodiment of the present disclosure, the information processed the current information processing is the information the user of the first client wants to obtain by applying for information processing. For example, in an equity incentive mechanism where stocks acquired by employees by exercising their options, the predetermined unit amount of resources is the unit cost for the information, the current unit amount of resources is the current unit cost of the information, M can be three months, one year, etc., and the present disclosure is not limited to any specific example, R, T, and E are all predetermined parameters. When the user inputs the amount of information to be processed currently into the information processing application interface, the server can calculate the processing cost. In addition, the server may need to balance the amount of resources to be transferred by the first client previously to the first target address and the amount of resources actually deserved by the company. Therefore, it is necessary to calculate the amount of resources actually deserved, and the amount of resources actually deserved can be obtained through step-by-step calculations based on the growth of resource and the amount of additional resources. The amount of resources to be returned or supplemented for the user of the first client can be obtained from the amount of resources actually deserved and the amount of resources to be transferred. In this embodiment, the server can directly process the information processing request using an embedded algorithm, without interacting with the first client and the second client, such that the processing efficiency can be significantly improved.

The second target address refers to the resource storage address of the user of the first client, such as the user's bank account, third-party platform account, etc. If the server obtains the amount of resources to be returned, the amount of resources to be returned will be returned to the second target address. If the server obtains the amount of resources to be supplemented, and it can transmit to the first client a third prompt message prompting the user to transfer the amount of resources to be supplemented to the first target address, and the user can transfer the amount of resources to be supplemented offline to the first target address. At the same time, the server adds the information corresponding to the amount of information to be processed into another account address of the user of the first client. For example, the information corresponding to the amount of information to be processed can be stocks obtained after the user exercises an option. The other account address may be the user's stock account in the company, etc. After completing the above processing, the server will identify the status of the information processing application submitted by the first client as completed.

At S24, in response to a polling initiated by the first client, a processing result of the information processing request is fed back to the first client when the processing the information processing request is completed.

Figure 5:
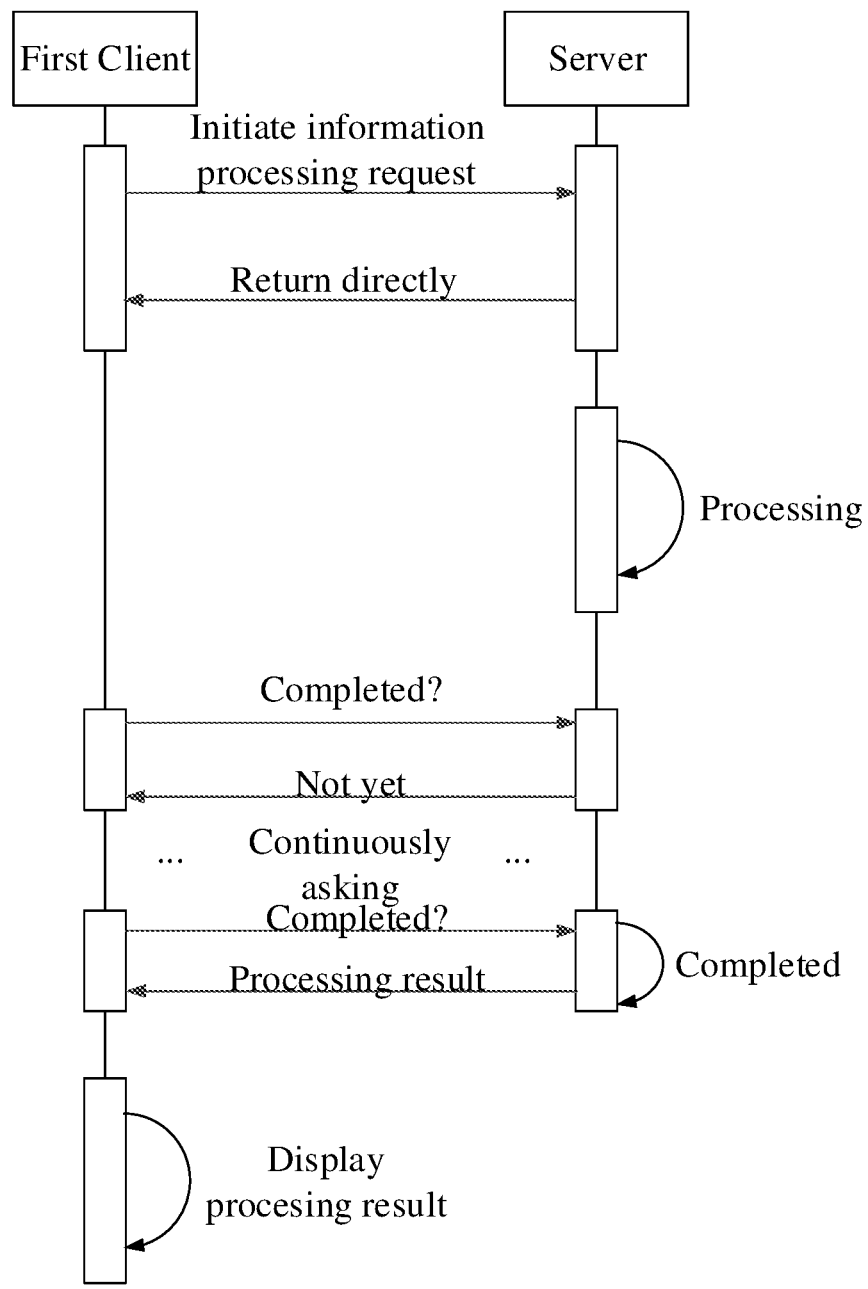
FIG. 5 is an example diagram showing interaction between a first client and a server according to an embodiment of the application.

In a specific embodiment of the present disclosure, as shown in FIG. 5, after the first client initiates the information processing request to the server, it returns directly without waiting for the server to feed back the processing result. The server starts to perform the processing operation in the step S23 after receiving the request. The first client automatically initiates a polling after returning to ask the server whether the processing is completed. If not, the first client will continue to ask until the server has completed the processing the current information processing request. The first client obtains the processing result from the server and displays it on the application record interface.

Optionally, the operation of feeding the processing result of the information processing request back to the first client may include: displaying detailed information of the current information processing on the first client. The detailed information may include an application date, a sequence number, a predetermined unit amount of resources, an amount of processed information, and a status identifier of the information processing application. That is, the processing result returned by the server to the first client may include but be not limited to the detailed information.

Figure 6:
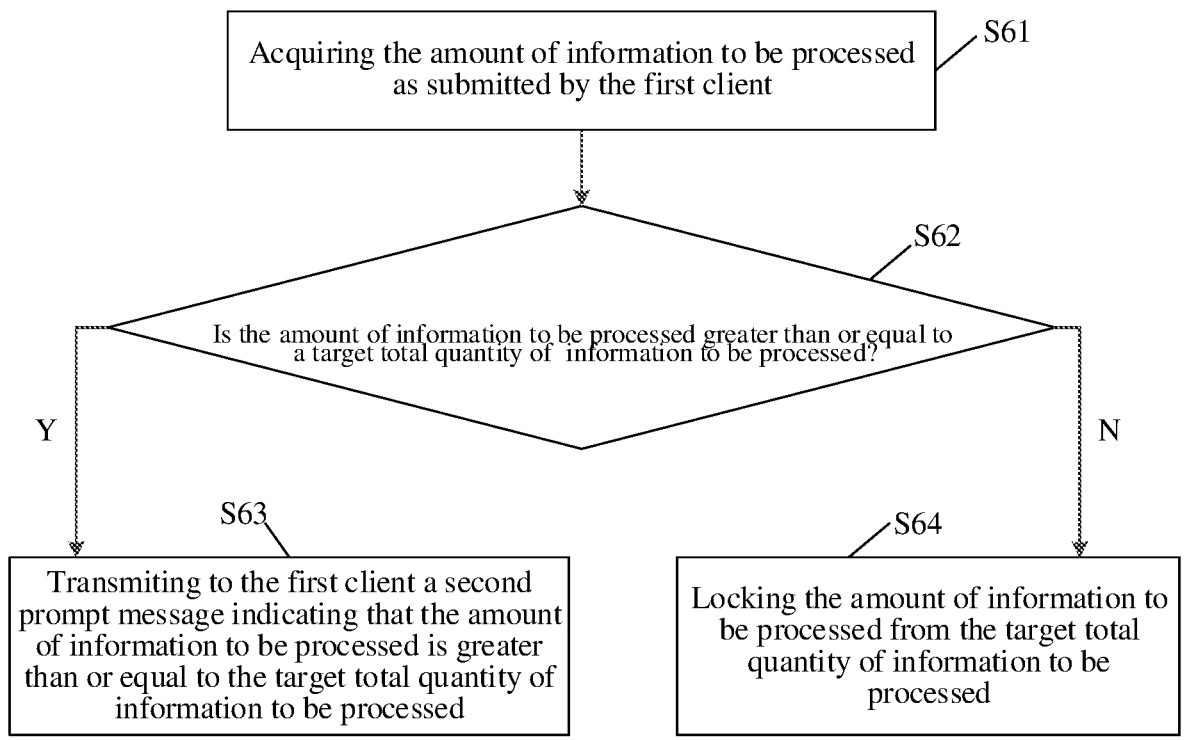
FIG. 6 is a schematic diagram showing a process for reviewing an amount of information to be processed according to an embodiment of the application.

Optionally, as shown in FIG. 6, prior to acquiring the information processing application transmitted by the first client, the method may further include:
  at S61, acquiring the amount of information to be processed as submitted by the first client;
  at S62, determining whether the amount of information to be processed is greater than or equal to a target total quantity of information to be processed;
  when the amount of information to be processed is greater than or equal to the target total quantity of information to be processed, proceeding with step S63, or otherwise, proceeding with step S64;
  at S63, transmitting to the first client a second prompt message indicating that the amount of information to be processed is greater than or equal to the target total quantity of information to be processed, the second prompt message being used to prompt the user of the first client to modify the amount of information to be processed; and
  at S64, locking the amount of information to be processed from the target total quantity of information to be processed.

In a specific embodiment of the present disclosure, the target total quantity of information to be processed refers to the maximum amount of information the user of the first client can apply for processing. When the user inputs the amount of information to be processed into the information processing application interface of the first client, the server will obtain the amount of information to be processed synchronously. The server obtains the target total quantity of information to be processed for the user of the first client by means of SQL statement or face matching. When the amount of information to be processed is greater than or equal to the target total quantity of information to be processed, the server can transmit to the first client a second prompt message, e.g., "The amount of information to be processed you enter exceeds the maximum amount of information you can apply for processing, please confirm for modification". After the user re-inputs the amount of information to be processed into the information processing application interface, the server will recalculate the amount of resources to be transferred and display it on the information processing application interface. When the amount of information to be processed is smaller than the target total quantity of information to be processed, it means that the amount of information to be processed is in compliance with the specification, and the server will lock the amount of information to be processed from the target total quantity of information to be processed. For example, if the target total quantity of information to be processed is 1000 and the amount of information to be processed is 500, the amount of 500 can be locked from 1000. After the information processing application is identified as the target information processing application, the amount of information to be processed is deducted from the target total quantity of information to be processed. If the user of the first client cancels the information processing application, the locked amount of information to be processed can be released from the target total quantity of information to be processed.

Optionally, subsequent to the information processing application is identified as the target information processing application, the method may further include: updating the target total quantity of information to be processed based on the amount of information to be processed and the target total quantity of information to be processed. That is, after the information processing application is identified as the target information processing application, the amount of information to be processed is deducted from the target total quantity of information to be processed to update the target total quantity of information to be processed.

Optionally, prior to determining whether the amount of information to be processed is greater than or equal to the target total quantity of information to be processed, the method may further include:
  acquiring a face image of the user of the first client;
  performing a face detection on the face image and cropping a face region image based on bounding box regression;
  determining whether a face in the face region image is occluded, and when the face in the face region image is occluded, complementing the face in the face region image using a ridge regression method to obtain a target face region image;

locating key points of the face on the target face region image using a pre-trained multi-task cascaded convolutional neural network, to obtain position information of the key points of the face, the key points of the face including a left corner of a mouth, a right corner of the mouth, a nose, a center point of a left eye, and a center point of a right eye;

obtaining a first affine transformation matrix T1 based on the position information of the left corner of the mouth, the position information of the right corner of the mouth, and an inclination angle of a connecting line between the left corner of the mouth and the right corner of the mouth;

performing an affine transformation on the target face region image based on the first affine transformation matrix T1 to obtain a first face region image;

obtaining a second affine transformation matrix T2 based on the position information of the center point of the left eye, the position information of the center point of the right eye, and an inclination angle of a connecting line between the center point of the left eye and the center point of the right eye;

performing an affine transformation on the first face region image based on the second affine transformation matrix T2 to obtain a second face region image;

inputting the second face region image into a pre-trained face recognition model for feature extraction, and determining the target total quantity of information to be processed based on extracted features.

Figure 7:
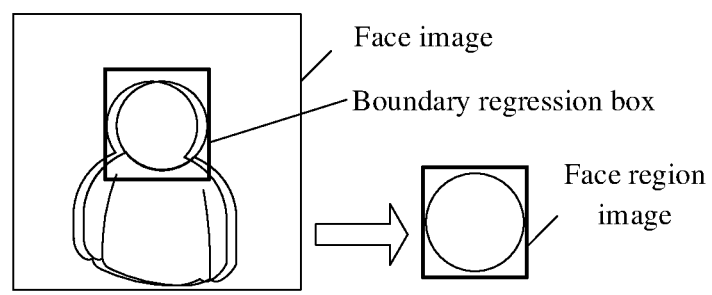
FIG. 7 is an example diagram showing cropping a face region image according to an embodiment of the application.

In a specific embodiment of the present disclosure, after the user inputs the amount of information to be processed into the information processing application interface, the server can obtain the target total quantity of information to be processed for the user by means of face matching. Specifically, the server can transmit an instruction for capturing a face image to the first client. After receiving the instruction for capturing the face image, the first client captures the user's face image via an image capture module and transmits the face image to the server. The server uses a face detector to detect the face image. As shown in FIG. 7, the face region image (that is, the image containing only the face region) is cropped from the face image based on the outputted bounding regression box. Here the face detector may be a you only look once (yolo) detector, a Single Shot MultiBox Detector (SSD), or the like. For the occluded face in the face region image, a ridge regression model can be established:

$$f_{\partial}(x_k) = \sum_{j=0}^{m} \partial_j x_{kj},$$

where $x_k$ represents the k-th row data of the matrix X, j=1, 2, ..., m, m represents the total number of matrix data, k=1, 2, ..., n, n represents the total number of rows of the matrix X, $x_{kj}$ represents the data in the j-th column and the k-th row, $f_{\partial}(x_k)$ represents a predicted value of the k-th group of sample data, i.e., the output of the ridge regression model, and matrix X is the feature matrix of the face region image. The method of the ridge regression is to find the parameter $\partial$ that minimizes the value of the cost function, so as to obtain a complete ridge regression model, thereby completing the face complementation operation to obtain a complemented face region image (i.e., the target face region image).

Figure 8:
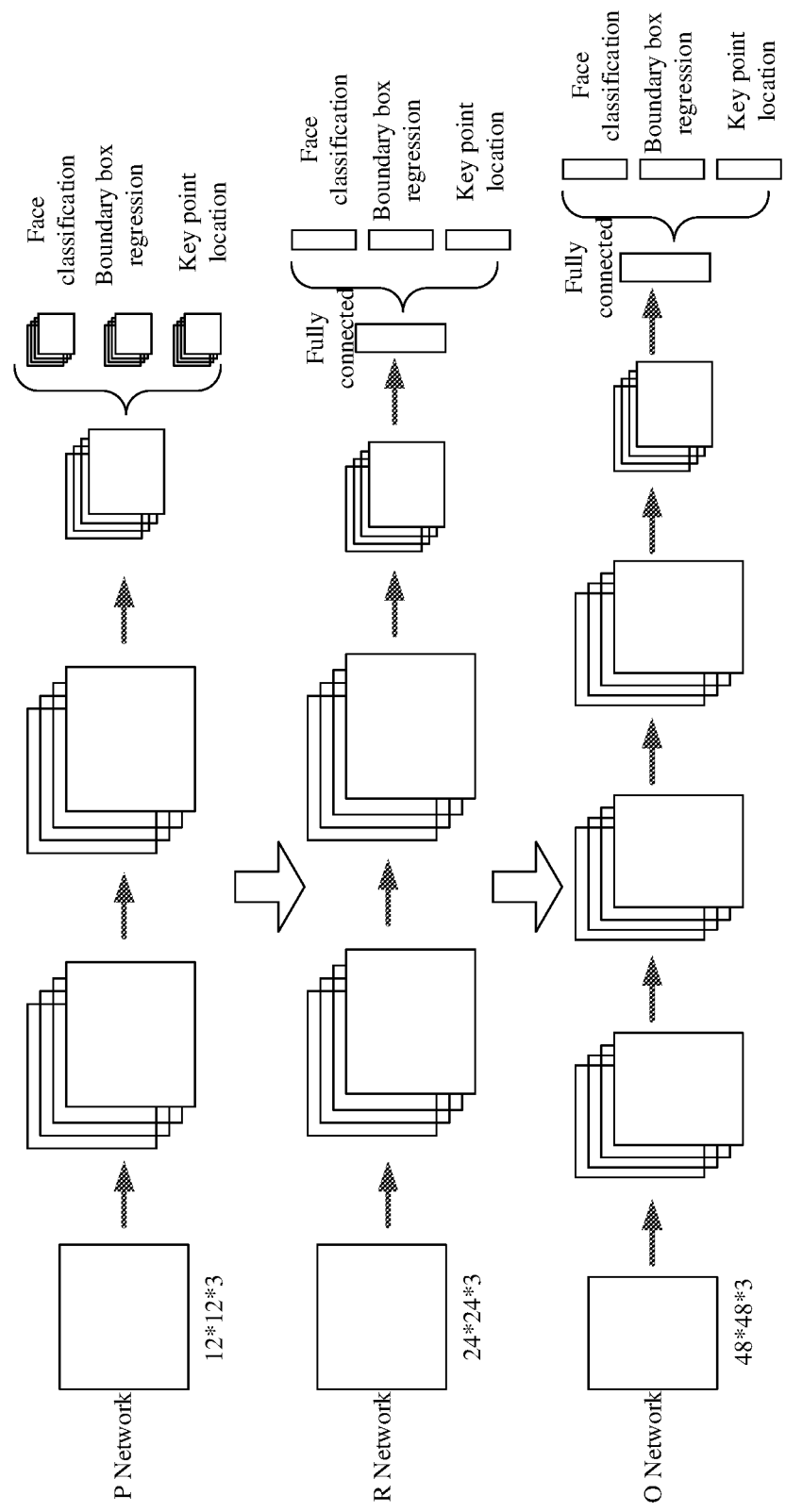
FIG. 8 is a schematic diagram showing a structure of a multi-task cascaded convolutional neural network according to an embodiment of the present disclosure.

For the target face region image, a Multi-Task Cascaded Convolutional Network (MTCNN) can be used to perform a face detection again to locate key points of the face. Here, as shown in FIG. 8, the MTCNN includes a P network, an R network and an O network. When the target face region image is obtained, it is first scaled, and images of different scales are used to construct an image pyramid. For example, the input size of the P network is 12*12*3, and the input size of the R network is 24*24*3, and the input size of the O network is 48*48*3. The P network is a fully convolutional network, which is used to generate candidate windows and bounding box regression vectors, such as a candidate window for the face, a candidate window for an eye, etc., and then correct these candidate windows, suppress non-local-maximum values for the candidate window, etc., and preliminarily locate the key points of the face. The candidate windows outputted by the P network are inputted into the R network for further screening to remove erroneous windows. The candidate windows outputted by the R network are inputted into the O network for further screening. However, in addition to a final face detection box, the output of the O network also includes the position information of five key points of the face, the left corner of the mouth, the right corner of the mouth, the nose, the center point of the left eye, and the center point of the right eye.

Based on the located position information of the left and right corners of the mouth, assuming that an inclination angle of a connecting line between the left and right corners of the mouth is θ1, a first affine transformation matrix T1 can be obtained as:

$$\begin{bmatrix} \cos\theta 1 & -\sin\theta 1 & 0 \\ \sin\theta 1 & \cos\theta 1 & 0 \\ 0 & 0 & 1 \end{bmatrix}.$$

The coordinates (x, y) of the pixel points in the target face region image can be multiplied by the first affine transformation matrix T1 to obtain a first face region image after affine transformation. In the same way, based on the previously located position information of the center points of the left and right eyes, assuming that an inclination angle of a connecting line between the center points of the left and right eyes is θ2, a second affine transformation matrix T2 can be obtained as:

$$\begin{bmatrix} \cos\theta 2 & -\sin\theta 2 & 0 \\ \sin\theta 2 & \cos\theta 2 & 0 \\ 0 & 0 & 1 \end{bmatrix}.$$

The coordinates (x1, y1) of the pixel points in the first face region image can be multiplied by the second affine transformation matrix T2 to obtain a second face region image after affine transformation. A pre-trained face recognition model can be used to extract features from the second face region image, and then feature matching can be performed to obtain the target total quantity of information to be processed for the user of the first client. In this embodiment, two face detections and two affine transformations are used, which can enable the face recognition model to obtain an input image with better quality, thereby improving the accuracy of face matching.

Figure 9:
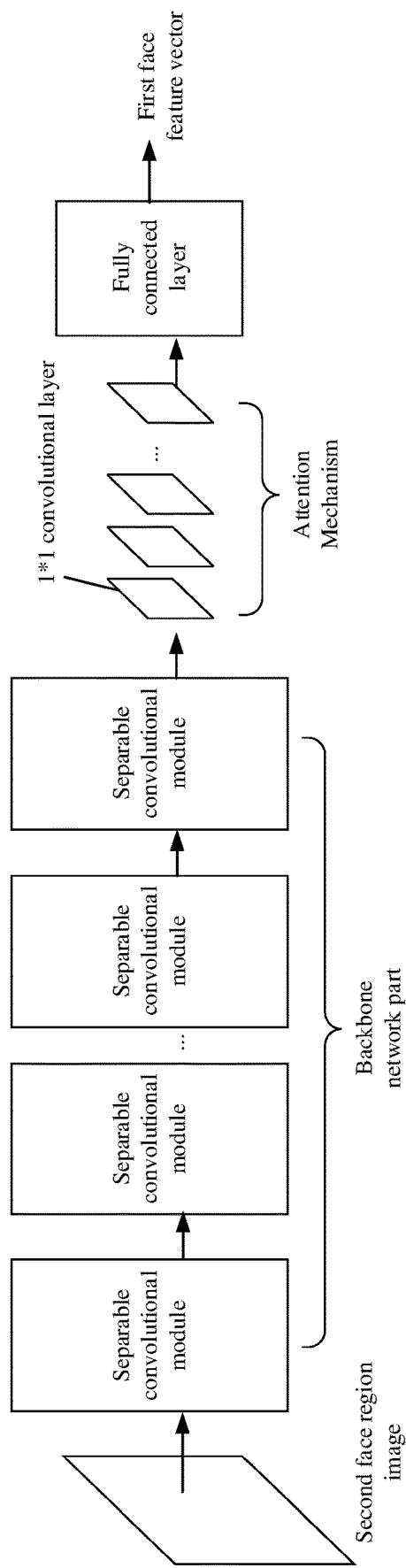
FIG. 9 is a schematic diagram showing a structure of a face recognition model according to an embodiment of the application.

Optionally, as shown in FIG. 9, the face recognition model may include a backbone network part, an attention mechanism, and a fully connected layer. The operation of inputting the second face region image into the pre-trained face recognition model for feature extraction and determining the target total quantity of information to be processed based on the extracted features may include:

inputting the second face region image into the backbone network part for feature extraction, to output a first feature map;

inputting the first feature map into the attention mechanism for convolution processing at a plurality of 1*1 convolutional layers, to output a second feature map having a same width and a same height as the first feature map;

multiplying the width and height of the first feature map with the width and height of the second feature map, respectively, to obtain a third feature map, and inputting the third feature map into the fully connected layer for classification, to output a first face feature vector of the face image; and acquiring a matching degree between the first face feature vector and second face feature vectors of a plurality of users stored in a database, and determining a total quantity of information to be processed for a user having a highest matching degree among the plurality of users as the target total quantity of information to be processed, each of the plurality of users having a corresponding total quantity of information to be processed.

Figure 10:
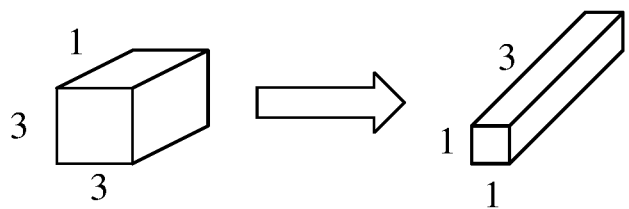
FIG. 10 is an example diagram showing a separable convolution according to an embodiment of the application.

In a specific embodiment of the present disclosure, the first feature map is the feature map outputted by the backbone network part, the second feature map is the feature map outputted by the attention mechanism, and the third feature map is the feature map obtained by fusing the first feature map and the second feature map. The backbone network part uses a plurality of separable convolution modules to perform convolution processing on the inputted second face region image to extract the first feature map. As shown in FIG. 10, a 3*3*3 convolution kernel in an original convolutional neural network is separated into a 3*3*1 convolution kernel and a 1*1*3 convolution kernel. For the 12*12*3 second face region image, each time the convolution processing is performed, it is first processed by the 3*3*1 convolution kernel to obtain a 10*10*3 feature map, which is then processed by the 1*1*3 convolution kernel to obtain a 10*10*1 feature map. The first feature map can be obtained by performing such convolution processing using the plurality of separable convolution modules. The separable convolution modules are advantageous in reducing model parameters and increasing the speed of calculation. The attention mechanism may include a plurality of 1*1 convolutional layers. The first feature map is inputted into the attention mechanism and is subjected to a plurality of 1*1 convolution processes, and then the second feature map is outputted. The second feature map has a same width and a same height as the first feature map. The second feature map is equivalent to obtained weights. The second feature map is multiplied with the first feature map with corresponding widths and heights to obtain the third feature map, which pays more attention on key information than the first feature map and can facilitate extraction of high-order features. The classification processing is performed on the third feature map by an activation function in the fully connected layer, and finally the first face feature vector of the user's face image is outputted.

Further, after obtaining the first face feature vector of the user of the first client, the server can match it with second face feature vectors of a plurality of users stored in the database. Specifically, it can be a one-to-one matching, or one-to-multiple matching, and the present disclosure is not limited to any of these example. The matching scheme may be to calculate a Euclidean distance or an Earth Mover's distance. For example, the Earth Mover's distance between the first face feature vector and the second face feature vector of Zhang in the database is the smallest, which means that the matching degree between the two is the highest, then it is determined that the user of the first client is Zhang, and it is determined that the target total quantity of information to be processed is the total quantity of pre-stored information to be processed for Zhang. In this embodiment, the face matching scheme is used to determine the target total quantity of the information to be processed for the user of the first client, which helps prevent illegal users from logging into the user's account to perform illegal information processing and improve security.

Optionally, subsequent to acquiring the information processing request for the target information processing application transmitted by the first client in accordance with the asynchronous mechanism, the method may further include:

determining whether a submission time of the information processing request is within a predetermined window period for information processing;

when the submission time of the information processing request is within the predetermined window period for information processing, transmitting a fourth prompt message to the first client, the fourth prompt message being used to remind the user of the first client of confirming a submission of the information processing request;

determining, in response to a signal indicating a confirmation of the submission as triggered on the first client, whether a time point at which the signal indicating the confirmation of the submission is triggered is within the window for information processing; and when the time point at which the signal indicating the confirmation of the submission is triggered is within the window for information processing, feeding back to the first client a message indicating that the information processing request is submitted successfully, or otherwise feeding back to the first client a message indicating that a current information processing is not within the window for information processing.

In a specific embodiment of the present disclosure, since a company may have strict restrictions on the window period for information processing, e.g., 9:30 to 11:30, only information processing requests submitted within the predetermined window period for information processing will be accepted. If the information processing request submitted by the user of the first client is within the window period for information processing, the fourth prompt message will be returned to the first client. For example, a reconfirmation interface for confirming whether to submit the information processing request can be returned. When the user triggers a signal for confirming the submission on the reconfirmation interface, the server may again determine whether the time when the signal for confirming the submission is triggered is still within the window period for information processing. When the time point at which the signal for confirming the submission is triggered is still within the window period for information processing, the user of the first client is informed about the successful submission of the current information processing request, or otherwise the user of the first client is prompted that the current information processing is not within the window period for information processing.

It can be seen that in the embodiment of the present disclosure, an information processing application transmitted by a first client is acquired, a predetermined command is executed in accordance with a timer-based task mechanism to transmit a first prompt message for reviewing the information processing application to a second client; in response to an operation instruction on the second client, the information processing application is identified as a target information processing application; an information processing request for the target information processing application transmitted by the first client is acquired in accordance with an asynchronous mechanism, and the information processing request is processed; and in response to a polling initiated by the first client, a processing result of the information processing request is fed back to the first client when the processing the information processing request is completed. In this way, the timer-based task mechanism executes the predetermined command to issue the review prompt, such that the reviewer can be notified in time, thereby shortening the information processing period. In addition, the asynchronous mechanism is used to initiate the information processing request, so as to prevent the first client from "waiting in vain", and reduce the dependence between task processes. The entire information processing can adopt an online-offline integrated form, without having to consider the problem of data resources. This is advantageous in improving the efficiency of information processing in the option exercise process, thereby improving the efficiency of option exercise.

Figure 11:
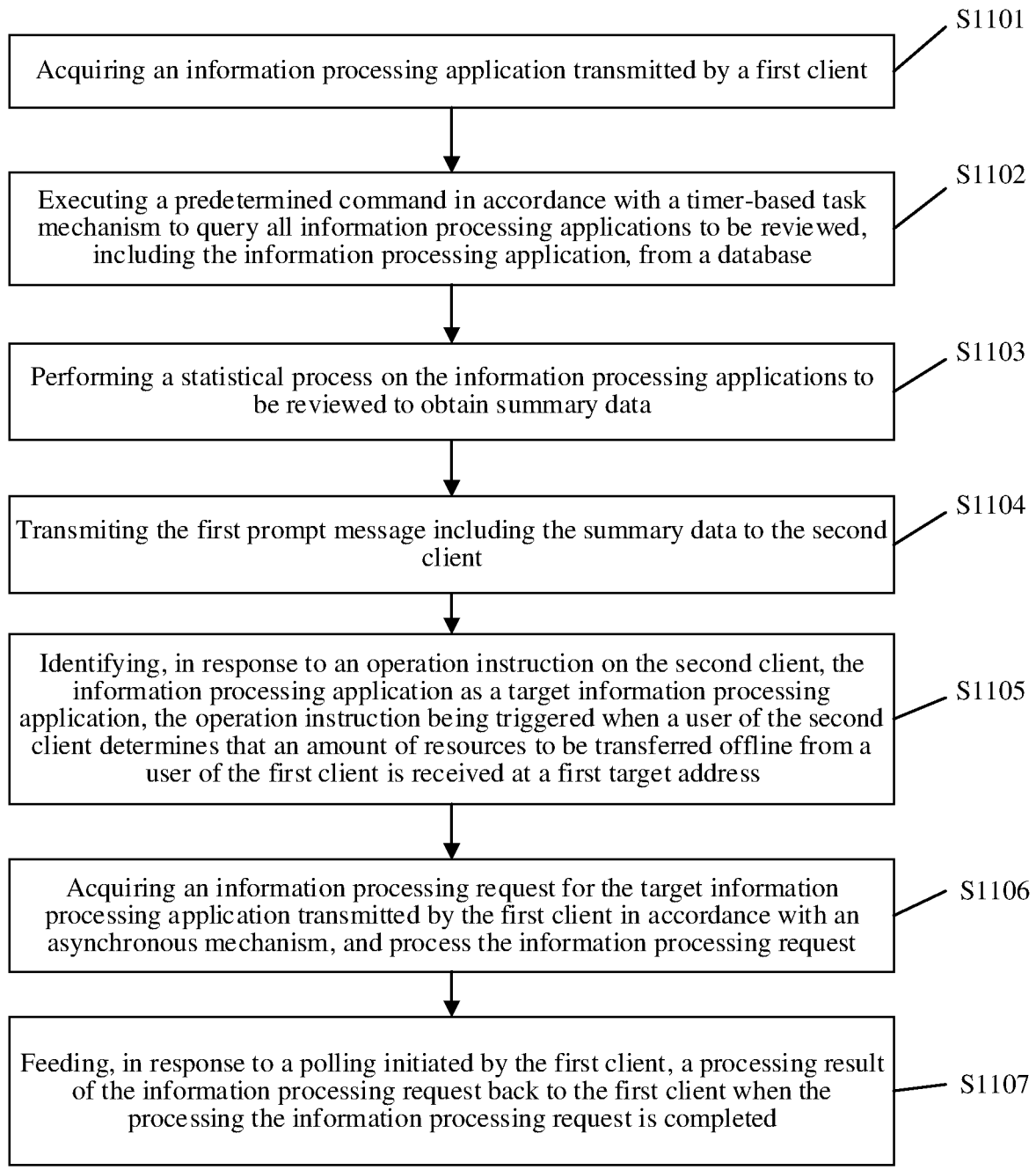
FIG. 11 is a schematic flowchart illustrating another information processing method according to an embodiment of the present disclosure.

FIG. 11 is a schematic flowchart illustrating another information processing method according to an embodiment of the application. As shown in FIG. 11, the method includes steps S1101 to S1107.

At S1101, an information processing application transmitted by a first client is acquired.

At S1102, a predetermined command is executed in accordance with a timer-based task mechanism to query all information processing applications to be reviewed, including the information processing application, from a database.

At S1103, statistically analyzing the information processing applications to be reviewed to obtain summary data.

At S1104, the first prompt message including the summary data is transmitted to the second client.

In a specific embodiment of the present disclosure, the predetermined command executed by the server in accordance with the timer-based task mechanism is to query all information processing applications whose statuses are identified as to be reviewed (i.e., information processing applications to be reviewed) from the database. Of course, the information processing application submitted by the first client is also one of the information processing applications to be reviewed. The server statistically analyzes the information processing applications to be reviewed, generates the summary data including the number of applicants, the number of applications, etc., and then transmits the first prompt message carrying the summary data to the second client to prompt the administrator to review, e.g., "There are currently 80 information processing applications submitted by 42 people that have not been reviewed, please process in time." For example, if the predetermined command is set to "0 7 * * * php send-notice-command", the server can execute the php send-notice-command command at 7 o'clock every day to retrieve the information processing applications to be reviewed from the database and transmit them to the second client.

At S1105, in response to an operation instruction on the second client, the information processing application is identified as a target information processing application. The operation instruction is triggered when a user of the second client determines that an amount of resources to be transferred offline from a user of the first client is received at a first target address.

At S1106, an information processing request for the target information processing application transmitted by the first client in accordance with an asynchronous mechanism is acquired, and the information processing request is processed.

At S1107, in response to a polling initiated by the first client, a processing result of the information processing request is fed back to the first client when the processing the information processing request is completed.

Here, some steps in the embodiment shown in FIG. 11 have been described in the embodiment shown in FIG. 2 and can achieve the same or similar advantageous effects, and details thereof will be omitted here for simplicity.

Figure 12:
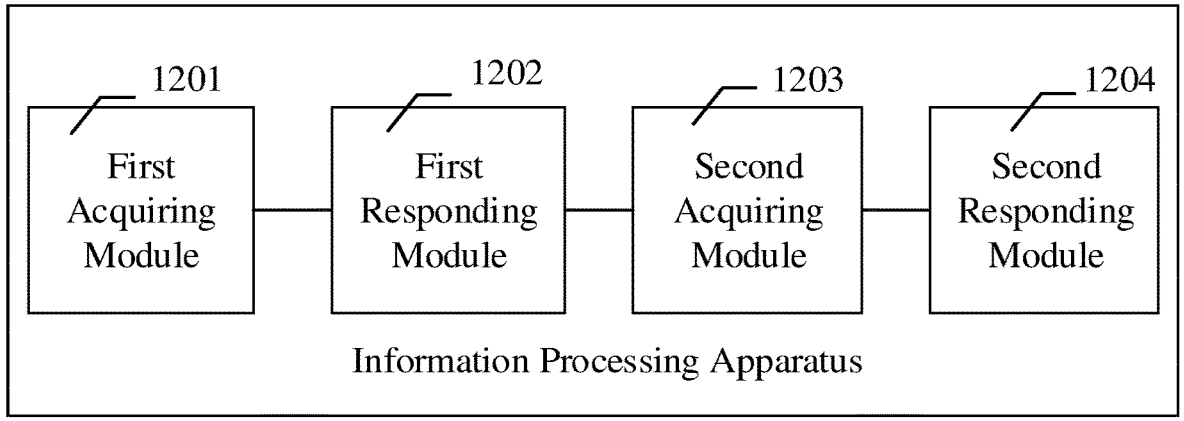
FIG. 12 is a schematic diagram showing a structure of an information processing apparatus according to an embodiment of the present disclosure.

FIG. 12 is a schematic diagram showing a structure of an information processing apparatus according to an embodiment of the application. As shown in FIG. 12, the apparatus includes:

a first acquiring module 1201 configured to acquire an information processing application transmitted by a first client, and execute a predetermined command in accordance with a timer-based task mechanism to transmit a first prompt message for reviewing the information processing application to a second client;

a first responding module 1202 configured to identify, in response to an operation instruction on the second client, the information processing application as a target information processing application, the operation instruction being triggered when a user of the second client determines that an amount of resources to be transferred offline from a user of the first client is received at a first target address;

a second acquiring module 1203 configured to acquire an information processing request for the target information processing application transmitted by the first client in accordance with an asynchronous mechanism, and process the information processing request; and a second responding module 1204 configured to feed, in response to a polling initiated by the first client, a processing result of the information processing request back to the first client when the processing the information processing request is completed.

Optionally, the first acquiring module 1201 may be configured to, when execute the predetermined command in accordance with the timer-based task mechanism to transmit the first prompt message for reviewing the information processing application to the second client:

execute the predetermined command in accordance with the timer-based task mechanism to query all information processing applications to be reviewed, including the information processing application, from a database;

statistically analyze the information processing applications to be reviewed to obtain summary data; and transmit the first prompt message including the summary data to the second client.

Optionally, the first acquiring module 1201 may be further configured to: acquire the amount of information to be processed as submitted by the first client; and determine whether the amount of information to be processed is greater than or equal to a target total quantity of information to be processed; and when the amount of information to be processed is greater than or equal to the target total quantity of information to be processed, transmit to the first client a second prompt message indicating that the amount of information to be processed is greater than or equal to the target total quantity of information to be processed, or otherwise lock the amount of information to be processed from the target total quantity of information to be processed, the second prompt message being used to prompt the user of the first client to modify the amount of information to be processed.

Optionally, the first acquiring module 1201 is further configured to: update the target total quantity of information to be processed based on the amount of information to be processed and the target total quantity of information to be processed.

Optionally, the first acquiring module 1201 is further configured to: acquire a face image of the user of the first client; perform a face detection on the face image and crop a face region image based on bounding box regression; determine whether a face in the face region image is occluded, and when the face in the face region image is occluded, complementing the face in the face region image using a ridge regression method to obtain a target face region image; locate key points of the face on the target face region image using a pre-trained multi-task cascaded convolutional neural network, to obtain position information of the key points of the face, the key points of the face including a left corner of a mouth, a right corner of the mouth, a nose, a center point of a left eye, and a center point of a right eye; obtain a first affine transformation matrix $T1$ based on the position information of the left corner of the mouth, the position information of the right corner of the mouth, and an inclination angle of a connecting line between the left corner of the mouth and the right corner of the mouth; perform an affine transformation on the target face region image based on the first affine transformation matrix $T1$ to obtain a first face region image; obtain a second affine transformation matrix $T2$ based on the position information of the center point of the left eye, the position information of the center point of the right eye, and an inclination angle of a connecting line between the center point of the left eye and the center point of the right eye; perform an affine transformation on the first face region image based on the second affine transformation matrix $T2$ to obtain a second face region image; input the second face region image into a pre-trained face recognition model for feature extraction, and determine the target total quantity of information to be processed based on extracted features.

Optionally, the face recognition model may include a backbone network part, an attention mechanism, and a fully connected layer. The first acquiring module 1201 may be further configured to: input the second face region image into the backbone network part for feature extraction, to output a first feature map; input the first feature map into the attention mechanism for convolution processing at a plurality of 1*1 convolutional layers, to output a second feature map having a same width and a same height as the first feature map; multiply the width and height of the first feature map with the width and height of the second feature map, respectively, to obtain a third feature map, and input the third feature map into the fully connected layer for classification, to output a first face feature vector of the face image; and acquire a matching degree between the first face feature vector and second face feature vectors of a plurality of users stored in a database, and determine a total quantity of information to be processed for a user having a highest matching degree among the plurality of users as the target total quantity of information to be processed, each of the plurality of users having a corresponding total quantity of information to be processed.

Optionally, the second acquiring module 1203 may be configured to, when processing the information processing request: calculate a processing cost of a current information processing based on a predetermined unit amount of resources of information processed the current information processing and the amount of information to be processed; calculate a growth of resource for the current information processing based on a current unit amount of resources of the information processed the current information processing, the predetermined unit amount of resources and the amount of information to be processed according to: $S=(P1-P2)*Q$, where S represents the growth of resource, P1 represents the current unit amount of resources, P2 represents the predetermined unit resource amount, and Q represents the amount of information to be processed; calculate an amount of additional resources for the current information processing based on the growth of resource according to: $P=(S/M*R-T)*M$, where P represents the amount of additional resources, M represents predetermined time, R represents a first predetermined parameter, and T represents a second predetermined parameter; calculate an amount of resources actually deserved for the current information processing based on the processing cost and the amount of additional resources according to: $N=(C+P)*E$, where N represents the amount of resources actually deserved, C represents the processing cost, and E represents a third predetermined parameter; calculate an amount of resources to be returned or supplemented for the current information processing based on the amount of resources to be transferred and the amount of resources actually deserved; transfer the amount of resources to be returned to a second target address when the amount of resources to be returned is calculated, or transmit to the first client a third prompt message including the amount of resources to be supplemented when the amount of resources to be supplemented is calculated, the third prompt message being used to prompt the user of the first client to transfer the amount of resources to be supplemented to the first target address; and identify the information processing application as a completed information processing application.

Optionally, the second acquiring module 1203 may be further configured to: determine whether a submission time of the information processing request is within a predetermined window period for information processing; when the submission time of the information processing request is within the predetermined window period for information processing, transmit a fourth prompt message to the first client, the fourth prompt message being used to remind the user of the first client of confirming a submission of the information processing request; determine, in response to a signal indicating a confirmation of the submission as triggered on the first client, whether a time point at which the signal indicating the confirmation of the submission is triggered is within the window period for information processing; and when the time point at which the signal indicating the confirmation of the submission is triggered is within the window period for information processing, feed back to the first client a message indicating that the information processing request is submitted successfully, or otherwise feed back to the first client a message indicating that a current information processing is not within the window period for information processing.

According to an embodiment of the present disclosure, the units in the information processing apparatus shown in FIG. 12 may be combined separately or all together into one or more other units, or one or more of them can also be divided into a plurality of smaller units functionally, which can achieve the same operation without affecting the realization of the technical effects of the embodiments of the present disclosure. The above units are divided based on logical functions. In practical applications, the function of one unit may be implemented by a plurality of units, or the functions of a plurality of units may be implemented by one unit. In other embodiments of the present disclosure, the information processing apparatus may also include other units. In practical applications, these functions may also be implemented with the assistance of other units, and may be implemented by a plurality of units in cooperation.

According to another embodiment of the present disclosure, a general-purpose computing device, such as a computer, including a processing element and a storage element, e.g., a Central Processing Unit (CPU), a Random Access Memory (RAM), a Read-Only Memory (ROM) can execute a computer program (including program codes) capable of performing the steps involved in the corresponding method shown in FIG. 2 or FIG. 11, to construct the information processing apparatus as shown in FIG. 12, and to implement the information processing method according to the embodiment of the present disclosure. The computer program may be recorded on, for example, a computer-readable recording medium, and loaded into and executed by the above computing device via the computer-readable recording medium.

Figure 13:
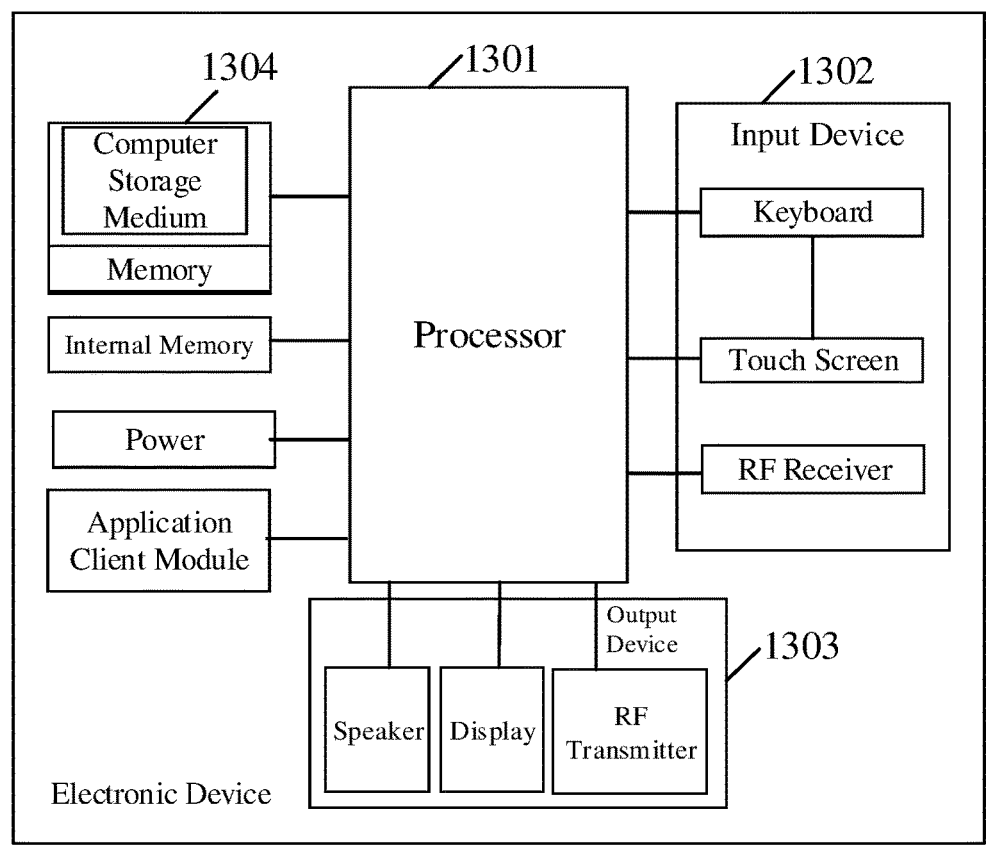
FIG. 13 is a schematic diagram showing a structure of an electronic device according to an embodiment of the present disclosure.

Based on the description of the above method embodiment and apparatus embodiment, an embodiment of the present disclosure also provides an electronic device. Referring to FIG. 13, the electronic device includes at least a processor 1301, an input device 1302, an output device 1303, and a computer storage medium 1304. Here, the processor 1301, the input device 1302, the output device 1303, and the computer storage medium 1304 in the electronic device may be connected by a bus or other means.

The computer storage medium 1304 may be stored in a memory of the electronic device. The computer storage medium 1304 is configured to store a computer program, which includes program instructions. The processor 1301 is configured to execute the program instructions stored in the computer storage medium 1304. The processor 1301 (or CPU) is the computing core and control core of the electronic device, and is adapted to implement one or more instructions, specifically adapted to load and execute one or more instructions to implement the corresponding method flow or corresponding function.

In one embodiment, the processor 1301 of the electronic device according to the embodiment of the present disclosure may be configured to perform a series of information processing, including: acquiring an information processing application transmitted by a first client, and executing a predetermined command in accordance with a timer-based task mechanism to transmit a first prompt message for reviewing the information processing application to a second client; identifying, in response to an operation instruction on the second client, the information processing application as a target information processing application, the operation instruction being triggered when a user of the second client determines that an amount of resources to be transferred offline from a user of the first client is received at a first target address; acquiring an information processing request for the target information processing application transmitted by the first client in accordance with an asynchronous mechanism, and processing the information processing request; and feeding, in response to a polling initiated by the first client, a processing result of the information processing request back to the first client when the processing the information processing request is completed.

In another embodiment, the processor 1301 executing the predetermined command in accordance with the timer-based task mechanism to transmit the first prompt message for reviewing the information processing application to the second client may include: executing the predetermined command in accordance with the timer-based task mechanism to query all information processing applications to be reviewed, including the information processing application, from a database; statistically analyzing the information processing applications to be reviewed to obtain summary data; and transmitting the first prompt message including the summary data to the second client.

In another embodiment, the information processing application may include the amount of resources to be transferred, and the amount of resources to be transferred is calculated based on an amount of information to be processed as submitted by the first client. The processor 1301 may be further configured to, prior to acquiring the information processing application transmitted by the first client: acquire the amount of information to be processed as submitted by the first client; and determine whether the amount of information to be processed is greater than or equal to a target total quantity of information to be processed; and when the amount of information to be processed is greater than or equal to the target total quantity of information to be processed, transmit to the first client a second prompt message indicating that the amount of information to be processed is greater than or equal to the target total quantity of information to be processed, or otherwise lock the amount of information to be processed from the target total quantity of information to be processed, the second prompt message being used to prompt the user of the first client to modify the amount of information to be processed. In another embodiment, the processor 1301 may be further configured to, subsequent to identifying the information processing application as the target information processing application: update the target total quantity of information to be processed based on the amount of information to be processed and the target total quantity of information to be processed.

In another embodiment, the processor 1301 may be further configured to, prior to determining whether the amount of information to be processed is greater than or equal to the target total quantity of information to be processed: acquire a face image of the user of the first client; perform a face detection on the face image and crop a face region image based on bounding box regression; determine whether a face in the face region image is occluded, and when the face in the face region image is occluded, complementing the face in the face region image using a ridge regression method to obtain a target face region image; locate key points of the face on the target face region image using a pre-trained multi-task cascaded convolutional neural network, to obtain position information of the key points of the face, the key points of the face including a left corner of a mouth, a right corner of the mouth, a nose, a center point of a left eye, and a center point of a right eye; obtain a first affine transformation matrix T1 based on the position information of the left corner of the mouth, the position information of the right corner of the mouth, and an inclination angle of a connecting line between the left corner of the mouth and the right corner of the mouth; perform an affine transformation on the target face region image based on the first affine transformation matrix T1 to obtain a first face region image; obtain a second affine transformation matrix T2 based on the position information of the center point of the left eye, the position information of the center point of the right eye, and an inclination angle of a connecting line between the center point of the left eye and the center point of the right eye; perform an affine transformation on the first face region image based on the second affine transformation matrix T2 to obtain a second face region image; input the second face region image into a pre-trained face recognition model for feature extraction, and determine the target total quantity of information to be processed based on extracted features.

In another embodiment, the face recognition model may include a backbone network part, an attention mechanism, and a fully connected layer. The processor 1301 inputting the second face region image into the pre-trained face recognition model for feature extraction and determining the target total quantity of information to be processed based on the extracted features may include: inputting the second face region image into the backbone network part for feature extraction, to output a first feature map; inputting the first feature map into the attention mechanism for convolution processing at a plurality of 1*1 convolutional layers, to output a second feature map having a same width and a same height as the first feature map; multiplying the width and height of the first feature map with the width and height of the second feature map, respectively, to obtain a third feature map, and inputting the third feature map into the fully connected layer for classification, to output a first face feature vector of the face image; and acquiring a matching degree between the first face feature vector and second face feature vectors of a plurality of users stored in a database, and determining a total quantity of information to be processed for a user having a highest matching degree among the plurality of users as the target total quantity of information to be processed, each of the plurality of users having a corresponding total quantity of information to be processed.

In another embodiment, the processor 1301 processing the information processing request may include: calculating a processing cost of a current information processing based on a predetermined unit amount of resources of information processed the current information processing and the amount of information to be processed; calculating an growth of resource for the current information processing based on a current unit amount of resources of the information processed the current information processing, the predetermined unit resource amount and the amount of information to be processed according to: $S=(P1-P2)*Q$, where S represents the growth of resource, P1 represents the current unit amount of resources, P2 represents the predetermined unit resource amount, and Q represents the amount of information to be processed; calculating an amount of additional resources for the current information processing based on the growth of resource according to: $P=(S/M*R-T)*M$, where P represents the amount of additional resources, M represents predetermined time, R represents a first predetermined parameter, and T represents a second predetermined parameter; calculating an amount of resources actually deserved for the current information processing based on the processing cost and the amount of additional resources according to: $N=(C+P)*E$, where N represents the amount of resources actually deserved, C represents the processing cost, and E represents a third predetermined parameter; calculating an amount of resources to be returned or supplemented for the current information processing based on the amount of resources to be transferred and the amount of resources actually deserved; transferring the amount of resources to be returned to a second target address when the amount of resources to be returned is calculated, or transmitting to the first client a third prompt message including the amount of resources to be supplemented when the amount of resources to be supplemented is calculated, the third prompt message being used to prompt the user of the first client to transfer the amount of resources to be supplemented to the first target address; and identifying the information processing application as a completed information processing application.

In another embodiment, the processor 1301 may be further configured to, subsequent to acquiring the information processing request for the target information processing application transmitted by the first client in accordance with the asynchronous mechanism: determine whether a submission time of the information processing request is within a predetermined window period for information processing; when the submission time of the information processing request is within the predetermined window period for information processing, transmit a fourth prompt message to the first client, the fourth prompt message being used to remind the user of the first client of confirming a submission of the information processing request; determine, in response to a signal indicating a confirmation of the submission as triggered on the first client, whether a time point at which the signal indicating the confirmation of the submission is triggered is within the window period for information processing; and when the time point at which the signal indicating the confirmation of the submission is triggered is within the window period for information processing, feed back to the first client a message indicating that the information processing request is submitted successfully, or otherwise feed back to the first client a message indicating that a current information processing is not within the window period for information processing.

Exemplarily, the above electronic device may be a server, a server cluster, a computer host, a cloud server, etc. The electronic device may include, but be not limited to, a processor 1301, an input device 1302, an output device 1303, and a computer storage medium 1304. It can be appreciated by those skilled in the art that the schematic diagram is only an example of the electronic device, and does not constitute a limitation on the electronic device. The electronic device may include more or fewer components than those shown in the figure, or a combination of certain components, or different components.

It is to be noted that since the processor 1301 of the electronic device executes the computer program to implement the steps in the information processing method described above, the embodiments of the information processing method as described above are all applicable to the electronic device, and can achieve the same or similar advantageous effect.

The embodiment of the present disclosure also provides a computer storage medium (Memory). The computer storage medium is a memory device in an electronic device for storing programs and data. It can be appreciated here that the computer storage medium here may include a built-in storage medium in a terminal, and of course may further include an extended storage medium supported by the terminal. The computer storage medium provides a storage space for storing an operating system of the terminal. In addition, one or more instructions adapted to be loaded and executed by the processor 1301 can be stored in the storage space, which may be one or more computer programs (including program codes). It is to be noted that the computer storage medium here can be a high-speed RAM memory, or a non-volatile memory, such as at least one magnetic disk memory. Alternatively, it can be at least one computer storage medium located remotely from the above processor 1301. In an embodiment, the processor 1301 can load and execute one or more instructions stored in the computer storage medium to implement the corresponding steps of the above information processing method.

Exemplarily, the computer program in the computer storage medium may include computer program codes, which may be in the form of source codes, object codes, executable files, or some intermediate form. The computer-readable medium may include: any entity or apparatus, recording medium, U disk, mobile hard disk, magnetic disk, optical disc, computer memory, or Read-Only Memory (ROM), Random Access Memory (RAM), electrical carrier signal, telecommunications signal, and software distribution medium, etc., capable of carrying computer program codes.

It is to be noted that, since the computer program in the computer storage medium is executed by the processor to implement the steps in the above information processing method, all the embodiments of the above information processing method are applicable to the computer storage medium, and can all achieve the same or similar advantageous effects.

The embodiments of the present disclosure have been described in detail above, and specific examples are used herein to illustrate the principles and embodiments of the present disclosure. The descriptions of the above examples are only used to facilitate understanding of the methods and core ideas of the present disclosure. For persons of ordinary skill in the art, based on the ideas of the present disclosure, changes can be made to the specific implementation and application range. In summary, the content of the description should not be construed as limiting the present disclosure.

What is claimed is:

1. An information processing method, comprising:
   acquiring, by a server, an information processing application transmitted by a first client, and executing, by the server, a predetermined command in accordance with a timer-based task mechanism to transmit a first prompt message for reviewing the information processing application to a second client;
   identifying, by the server, in response to an operation instruction on the second client, the information processing application as a target information processing application, the operation instruction being triggered when a user of the second client determines that an amount of resources to be transferred offline from a user of the first client is received at a first target address;
   acquiring, by the server, an information processing request for the target information processing application, and processing, by the server, the information processing request, the information processing request being transmitted by the first client in accordance with an asynchronous mechanism; and
   feeding, by the server, in response to a polling initiated by the first client, a processing result of the information processing request back to the first client when said processing the information processing request is completed,
   wherein the information processing application comprises the amount of resources to be transferred, and the amount of resources to be transferred is calculated based on an amount of information to be processed as submitted by the first client, and
   wherein the method further comprises, prior to acquiring, by the server, the information processing application transmitted by the first client:
   acquiring, by the server, the amount of information to be processed as submitted by the first client; and
   determining, by the server, whether the amount of information to be processed is greater than or equal to a target total quantity of information to be processed that is obtained by means of face matching; and
   transmitting, by the server, when the amount of information to be processed is greater than or equal to the target total quantity of information to be processed, to the first client a second prompt message indicating that the amount of information to be processed is greater than or equal to the target total quantity of information to be processed,
   wherein the second prompt message is used to prompt the user of the first client to modify the amount of information to be processed, and when the amount of information to be processed is smaller than the target total quantity of information to be processed, the amount of information to be processed is locked from the target total quantity of information to be processed, and
   wherein the method further comprises, subsequent to identifying, by the server, the information processing application as the target information processing application:
   updating, by the server, the target total quantity of information to be processed based on the amount of information to be processed and the target total quantity of information to be processed,
   the method further comprises, prior to determining, by the server, whether the amount of information to be processed is greater than or equal to the target total quantity of information to be processed:
   acquiring, by the server, a face image of the user of the first client;
   performing, by the server, a face detection on the face image and cropping, by the server, a face region image based on bounding box regression;
   determining, by the server, whether a face in the face region image is occluded, and when the face in the face region image is occluded, complementing, by the server, the face in the face region image using a ridge regression method to obtain a target face region image;
   locating, by the server, key points of the face on the target face region image using a pre-trained multi-task cascaded convolutional neural network, to obtain position information of the key points of the face, the key points of the face comprising a left corner of a mouth, a right corner of the mouth, a nose, a center point of a left eye, and a center point of a right eye;
   obtaining, by the server, a first affine transformation matrix T1 based on the position information of the left corner of the mouth, the position information of the right corner of the mouth, and an inclination angle of a connecting line between the left corner of the mouth and the right corner of the mouth;
   performing, by the server, an affine transformation on the target face region image based on the first affine transformation matrix T1 to obtain a first face region image;
   obtaining, by the server, a second affine transformation matrix T2 based on the position information of the center point of the left eye, the position information of the center point of the right eye, and an inclination angle of a connecting line between the center point of the left eye and the center point of the right eye;
   performing, by the server, an affine transformation on the first face region image based on the second affine transformation matrix T2 to obtain a second face region image; and
   inputting, by the server, the second face region image into a pre-trained face recognition model for feature extraction, and determining, by the server, the target total quantity of information to be processed based on extracted features.

2. The method according to claim 1, wherein said executing, by the server, the predetermined command in accordance with the timer-based task mechanism to transmit the first prompt message for reviewing the information processing application to the second client comprises:
executing, by the server, the predetermined command in accordance with the timer-based task mechanism to query all information processing applications to be reviewed, comprising the information processing application, from a database;
statistically analyzing, by the server, the information processing applications to be reviewed to obtain summary data; and
transmitting, by the server, the first prompt message comprising the summary data to the second client.

3. The method according to claim 1, wherein the face recognition model comprises a backbone network part, an attention mechanism, and a fully connected layer, and wherein said inputting, by the server, the second face region image into the pre-trained face recognition model for feature extraction and determining, by the server, the target total quantity of information to be processed based on the extracted features comprises:
inputting, by the server, the second face region image into the backbone network part for feature extraction, to output a first feature map;
inputting, by the server, the first feature map into the attention mechanism for convolution processing at a plurality of 1*1 convolutional layers, to output a second feature map having a same width and a same height as the first feature map;
multiplying, by the server, the width and height of the first feature map with the width and height of the second feature map, respectively, to obtain a third feature map, and inputting the third feature map into the fully connected layer for classification, to output a first face feature vector of the face image; and
acquiring, by the server, a matching degree between the first face feature vector and second face feature vectors of a plurality of users stored in a database, and determining, by the server, a total quantity of information to be processed for a user having a highest matching degree among the plurality of users as the target total quantity of information to be processed, each of the plurality of users having a corresponding total quantity of information to be processed.

4. The method according to claim 1, wherein said processing, by the server, the information processing request comprises:
calculating, by the server, a processing cost of a current information processing based on a predetermined unit amount of resources of information processed in the current information processing and the amount of information to be processed;
calculating, by the server, a growth of resource for the current information processing based on a current unit amount of resources of the information processed in the current information processing, by the server, the predetermined unit resource amount, and the amount of information to be processed in accordance with: $S=(P1-P2)*Q$, where S represents the growth of resource, P1 represents the current unit amount of resources, P2 represents the predetermined unit amount of resources, and Q represents the amount of information to be processed;
calculating, by the server, an amount of additional resources for the current information processing based on the growth of resource in accordance with: $P=(S/M*R-T)*M$, where P represents the amount of additional resources, M represents a predetermined time, R represents a first predetermined parameter, and T represents a second predetermined parameter;
calculating, by the server, an amount of resources actually deserved for the current information processing based on the processing cost and the amount of additional resources in accordance with: $N=(C+P)*E$, where N represents the amount of resources actually deserved, C represents the processing cost, and E represents a third predetermined parameter;
calculating, by the server, an amount of resources to be returned or an amount of resources to be supplemented for the current information processing based on the amount of resources to be transferred and the amount of resources actually deserved;
transferring, by the server, the amount of resources to be returned to a second target address when the amount of resources to be returned is calculated, or transmitting, by the server, to the first client a third prompt message comprising the amount of resources to be supplemented when the amount of resources to be supplemented is calculated, the third prompt message being used to prompt the user of the first client to transfer the amount of resources to be supplemented to the first target address; and
identifying, by the server, the information processing application as a completed information processing application.

5. The method according to claim 1, further comprising, subsequent to acquiring, by the server, the information processing request for the target information processing application transmitted by the first client in accordance with the asynchronous mechanism:
determining, by the server, whether a submission time of the information processing request is within a predetermined window period for information processing;
when the submission time of the information processing request is within the predetermined window period for information processing, transmitting, by the server, a fourth prompt message to the first client, the fourth prompt message being used to remind the user of the first client of confirming a submission of the information processing request;
determining, by the server, in response to a signal indicating a confirmation of the submission as triggered on the first client, whether a time point at which the signal indicating the confirmation of the submission is triggered is within the window period for information processing; and
when the time point at which the signal indicating the confirmation of the submission is triggered is within the window period for information processing, feeding, by the server, back to the first client a message indicating that the information processing request is submitted successfully, or otherwise feeding, by the server, back to the first client a message indicating that a current information processing is not within the window period for information processing.

6. An electronic device, comprising:
an input device;

an output device;

a computer storage medium having one or more instructions stored thereon; and a processor configured to execute the one or more instructions; wherein the one or more instructions are configured to be loaded by the processor to implement the method according to claim 1.

7. A computer storage medium, having one or more instructions stored thereon, wherein the one or more instructions are configured to be loaded by a processor to implement the method according to claim 1.

8. An information processing apparatus applied in a server, comprising:

a first acquiring module configured to acquire an information processing application transmitted by a first client, and execute a predetermined command in accordance with a timer-based task mechanism to transmit a first prompt message for reviewing the information processing application to a second client;

a first responding module configured to identify, in response to an operation instruction on the second client, the information processing application as a target information processing application, the operation instruction being triggered when a user of the second client determines that an amount of resources to be transferred offline from a user of the first client is received at a first target address;

a second acquiring module configured to acquire an information processing request for the target information processing application, and process the information processing request, the information processing request being transmitted by the first client in accordance with an asynchronous mechanism; and a second responding module configured to feed, in response to a polling initiated by the first client, a processing result of the information processing request back to the first client when said processing the information processing request is completed, wherein the information processing application comprises the amount of resources to be transferred, and the amount of resources to be transferred is calculated based on an amount of information to be processed as submitted by the first client, and wherein prior to acquiring the information processing application transmitted by the first client, the first acquiring module is further configured to:

acquire the amount of information to be processed as submitted by the first client; and determine whether the amount of information to be processed is greater than or equal to a target total quantity of information to be processed that is obtained by means of face matching; and transmit, when the amount of information to be processed is greater than or equal to the target total quantity of information to be processed, to the first client a second prompt message indicating that the amount of information to be processed is greater than or equal to the target total quantity of information to be processed, wherein the second prompt message is used to prompt the user of the first client to modify the amount of information to be processed, and when the amount of information to be processed is smaller than the target total quantity of information to be processed, the amount of information to be processed is locked from the target total quantity of information to be processed, wherein the first acquiring module is further configured to, subsequent to identifying the information processing application as the target information processing application: update the target total quantity of information to be processed based on the amount of information to be processed and the target total quantity of information to be processed, wherein the first acquiring module is further configured to, prior to determining whether the amount of information to be processed is greater than or equal to the target total quantity of information to be processed:

acquire a face image of the user of the first client;

perform a face detection on the face image and crop a face region image based on bounding box regression;

determine whether a face in the face region image is occluded, and when the face in the face region image is occluded, complement the face in the face region image using a ridge regression method to obtain a target face region image;

locate key points of the face on the target face region image using a pre-trained multi-task cascaded convolutional neural network, to obtain position information of the key points of the face, the key points of the face including a left corner of a mouth, a right corner of the mouth, a nose, a center point of a left eye, and a center point of a right eye;

obtain a first affine transformation matrix T1 based on the position information of the left corner of the mouth, the position information of the right corner of the mouth, and an inclination angle of a connecting line between the left corner of the mouth and the right corner of the mouth;

perform an affine transformation on the target face region image based on the first affine transformation matrix T1 to obtain a first face region image;

obtain a second affine transformation matrix T2 based on the position information of the center point of the left eye, the position information of the center point of the right eye, and an inclination angle of a connecting line between the center point of the left eye and the center point of the right eye;

perform an affine transformation on the first face region image based on the second affine transformation matrix T2 to obtain a second face region image;

input the second face region image into a pre-trained face recognition model for feature extraction, and determine the target total quantity of information to be processed based on extracted features.

* * * * *